US010996865B2

(12) United States Patent
Parker et al.

(10) Patent No.: US 10,996,865 B2
(45) Date of Patent: May 4, 2021

(54) APPLICATION-SPECIFIC MEMORY SCALING IN MULTI-DEVICE SYSTEMS

(71) Applicant: Nvidia Corporation, Santa Clara, CA (US)

(72) Inventors: Steve Parker, Santa Clara, CA (US); Martin Stich, Santa Clara, CA (US); Konstantin Vostryakov, Santa Clara, CA (US)

(73) Assignee: Nvidia Corporation, Santa Clara, CA (US)

(*) Notice: Subject to any disclaimer, the term of this patent is extended or adjusted under 35 U.S.C. 154(b) by 239 days.

(21) Appl. No.: 15/480,966

(22) Filed: Apr. 6, 2017

(65) Prior Publication Data

US 2017/0300253 A1 Oct. 19, 2017

Related U.S. Application Data

(60) Provisional application No. 62/319,082, filed on Apr. 6, 2016.

(51) Int. Cl.
*G06F 3/06* (2006.01)
*G06F 9/46* (2006.01)

(52) U.S. Cl.
CPC ............ *G06F 3/0619* (2013.01); *G06F 3/065* (2013.01); *G06F 3/0605* (2013.01); *G06F 3/067* (2013.01); *G06F 3/0631* (2013.01); *G06F 3/0647* (2013.01); *G06F 3/0683* (2013.01); *G06F 3/0685* (2013.01); *G06F 9/46* (2013.01)

(58) Field of Classification Search
CPC .................................... G06F 3/06; G06F 9/46
See application file for complete search history.

(56) References Cited

U.S. PATENT DOCUMENTS

| | | | | |
|---|---|---|---|---|
| 7,716,274 | B1 * | 5/2010 | Kumar | G06F 9/461 709/203 |
| 10,452,632 | B1 * | 10/2019 | Simmen | G06F 16/27 |
| 2005/0138284 | A1 * | 6/2005 | Cohn | G06F 11/1076 711/114 |
| 2008/0229315 | A1 * | 9/2008 | Yoshida | G06F 9/466 718/102 |
| 2010/0306493 | A1 * | 12/2010 | Carrillo | G06F 16/2282 711/167 |
| 2011/0321058 | A1 * | 12/2011 | Schmidt | G06F 9/505 718/105 |
| 2015/0049094 | A1 * | 2/2015 | Yan | G06T 1/20 345/502 |
| 2015/0066834 | A1 * | 3/2015 | Jeffries | H04N 19/463 706/52 |
| 2016/0065492 | A1 * | 3/2016 | Hu | H04L 47/783 709/226 |
| 2016/0350154 | A1 * | 12/2016 | Clohset | G06T 15/005 |

* cited by examiner

*Primary Examiner* — Charles Rones
*Assistant Examiner* — Tian-Pong Chang

(57) ABSTRACT

One aspect of the current disclosure provides a method for utilizing a plurality of memories associated with a plurality of devices in a computer system. The method includes: 1) receiving a data set for executing an application employing the devices; 2) determining whether the data set is larger than a storage capacity of any of the memories; and 3) when the data set is larger than the storage capacity of any of the memories, replicating a portion of the data set across the memories and distributing a remaining portion of the data set across at least some of the memories.

20 Claims, 4 Drawing Sheets

100
CPU 110
DEVICE A 122
126
DEVICE B 124
ISLAND 120
140
DEVICE C 132
136
DEVICE D 134
ISLAND 130

APPLICATION-SPECIFIC MEMORY SCALING IN MULTI-DEVICE SYSTEMS

CROSS-REFERENCE TO RELATED APPLICATION

This application claims the benefit of U.S. Provisional Application Ser. No. 62/319,082, filed by Steve Parker, et al. on Apr. 6, 2016, entitled "DOMAIN-SPECIFIC MEMORY SCALING IN MULTI-DEVICE SYSTEMS," commonly assigned with this application and incorporated herein by reference.

TECHNICAL FIELD

This application is directed, in general, to a multi-device computer system and, more specifically, to a multi-device computer system for efficiently utilizing local memories of the devices.

BACKGROUND

In a multi-device computer system, devices can access data locally, e.g., access one's own memory, and access data remotely, e.g., accessing other device's memory. While a local access is generally faster than a remote access, the amount of data a device can access locally is limited to the capacity of the device's own memory and can often become insufficient for data-rich applications of today. A remote access, on the other hand, does not suffer from the capacity issue since it allows a device to access memories of other devices. But as mentioned above, remote access is slow compared to the local access and can be even slower if connected through a slow, conventional link such as Peripheral Component Interconnect Express (PCIe). As such, what is needed is a multi-device computer system that utilizes both local and remote accesses to exploit the available memory capacity to the full extent while efficiently running/executing an application.

SUMMARY

One aspect of the current disclosure provides a method for utilizing a plurality of memories associated with a plurality of devices in a computer system. The method includes: 1) receiving a data set for executing an application employing the devices; 2) determining whether the data set is larger than a storage capacity of any of the memories; and 3) when the data set is larger than the storage capacity of any of the memories, replicating a portion of the data set across the memories and distributing a remaining portion of the data set across at least some of the memories.

Another aspect of the current disclosure provides a computer program product stored in a non-transitory computer readable medium that, when executed, causes a processor to: 1) receive a data set for executing an application employing devices of a multi-device computer system, wherein each of the devices has a memory; 2) determine whether the data set is larger than a storage capacity of any of the memories; and 3) when the data set is larger than the storage capacity of any of the memories, replicate a portion of the data set across the memories and distribute a remaining portion of the data set across at least some of the memories.

Yet another aspect of the current disclosure provides a multi-device system. The system includes: 1) a plurality of devices connected to one another, each having a memory; and 2) a processor connected to the devices and configured to determine whether a data set for executing an application employing the devices is larger than a storage capacity of any of the memories; and when the data set is larger than the storage capacity of any of the memories, replicate a portion of the data set across the memories and distribute a remaining portion of the data set across at least some of the memories.

BRIEF DESCRIPTION

Reference is now made to the following descriptions taken in conjunction with the accompanying drawings, in which.

DETAILED DESCRIPTION

Figure 1:
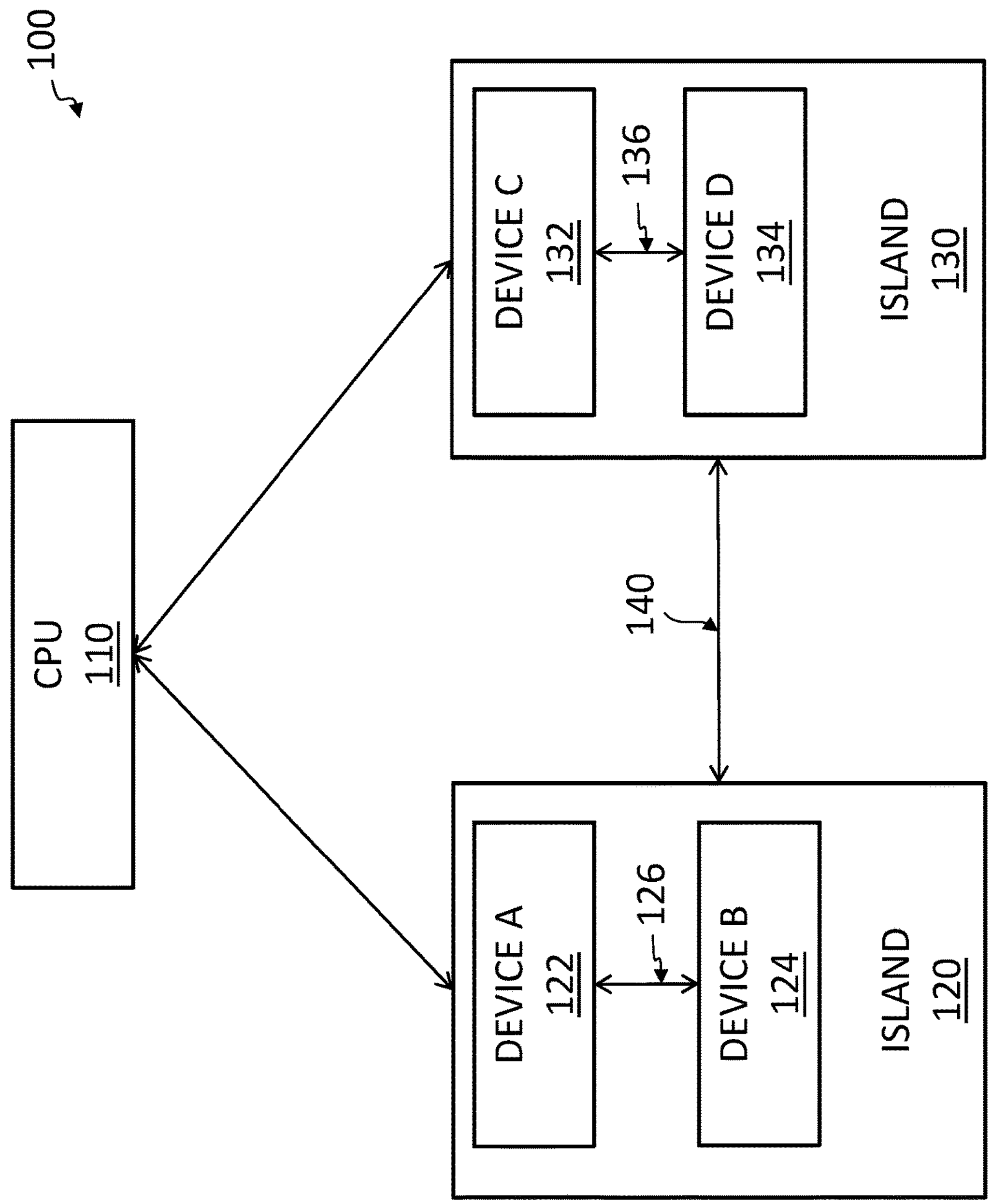
FIG. 1 illustrates a block diagram of an example multi-device computer system constructed according to the principles of the disclosure.

One of the ways to allocate a given application's workload/data set across the devices of a system such as a multi-device computer system is to replicate the data set in each device's memory. This usually represents the most runtime-efficient strategy, as each device can access the required data from their respective local memories using speedy local access. But this straightforward allocation breaks down once the application's workload becomes larger than a single device's local memory can support.

At the other end of the spectrum is distributing/spreading the workload across the memories by avoiding the replication altogether. As the workload is allocated exactly once across the memories, this allocation maximizes the memory capacities of the system. This, however, is not runtime efficient because most of the workload has to be accessed remotely, often across slow, conventional links between the devices.

Oftentimes, workloads of most of today's applications are too large to be replicated fully in each device's memory but not large enough to be fully distributed across the memories. Recognized from this quandary is a need for an allocation scheme that can smartly strike a balance between the replication and the distribution based on the size of the workload and memories. An allocation scheme that can satisfy the memory requirement of a given application and at the same time, maximize the execution performance of the application would be highly beneficial.

Introduced herein is an allocation scheme and various apparatuses and products using the allocation scheme that employ an iterative algorithm to efficiently utilize device memories of a multi-device computer system. In one example, the introduced allocation scheme begins by trying to replicate a given data set of an application locally on all devices. When this cannot be satisfied, the scheme makes decisions about which allocations/portions of the data set need to be distributed, e.g., accessed remotely by some devices, and which portions need to be replicated, e.g., accessed locally. The scheme also decides which device memories to distribute the non-replicated portions. For example, in a system with 8 devices, the scheme can decide to distribute only across devices on an island, if intra-island connections are fast and inter-island connections are slow. If memory pressure increases further, it can decide to distribute across all devices, even across the slow inter-island link.

Since these decisions are crucial for later access performance, the disclosed scheme can use as much application-specific information as possible to make the decisions. Usually, the portion of the data set that is expected to be most heavily accessed is replicated as much as possible and the portion that is expected to be accessed less is distributed as little as possible. As the replicated portion of the data set is maximized, the system enjoys the benefit of the speedy local access to the full extent. Also, as the non-replicated portion is minimized and selectively distributed across the devices with faster link, the penalties from using remote access are minimized. The introduced techniques thus allow the system to satisfy the memory requirement of a given application while maximizing its performance by exploiting the application and system specific knowledge.

In one embodiment of the disclosure, a multi-device computer system receives a data set needed to execute an application. Since the fastest way for the devices of the system to access the data set is to store and access the data set locally, the system first determines whether it can replicate the data set in each device's local memory. If the data set can be replicated in each memory, the data set is replicated in the local memory of each device and accessed locally when the application is executed. If the data set cannot be replicated fully in each memory, the system apportions as much of the data set as it can for replication and distribute remaining portion of the data set across at least some of the memories. Since using the local access to the full extent is beneficial, more frequently accessed portion of the data set is apportioned for replication. Also to minimize the delays caused by the remote access, the remaining portion is distributed selectively across the devices having faster link speeds.

FIG. 1 illustrates a block diagram of an example multi-device computer system 100. In the illustrated embodiment, the system 100 includes a central processing unit (CPU) 110 connected to a first island 120 of devices, including a device A 122 and a device B 124, and a second island 130 of devices, including a device C 132 and a device D 134. The system 100 is configured to execute an application employing the processing power and the memory resources of the CPU 110 and the devices 122, 124, 132 and 134.

In the current disclosure, the term "device" refers to a processor with some amount of memory local to that processor. A specific example of a device would be a graphics/video card with a graphics processing unit (GPU) and an on-board random-access memory such as a dynamic random-access memory (DRAM). In the current disclosure, the term "island" refers to a subset of devices, such as the devices 122, 124, 132, and 134 that are connected using a certain link type, while being connected to devices outside the subset using a different link type. For example, while devices within each island, e.g., 122 and 124 in the first island 120, and 132 and 134 in the second island 130, are connected to one another using a high-speed link 126 and 136 such as NVLink™ from Nvidia Corporation of Santa Clara, Calif., they are connected to devices outside their islands using a convention, low-speed link 140 such as PCIe.

In the illustrated embodiment, the CPU 110 may be a general-purpose computer, and the islands 120 and 130 may be subsets of graphics cards. It is understood that the CPU 110 is not limited to a general-purpose computer and may be a special-purpose computer that executes an application employing devices such as those in the islands 120 and 130 in FIG. 1. It is also understood that while FIG. 1 illustrates two islands, the number of islands is not limited to two (2) and may be any positive integer.

Figure 2:
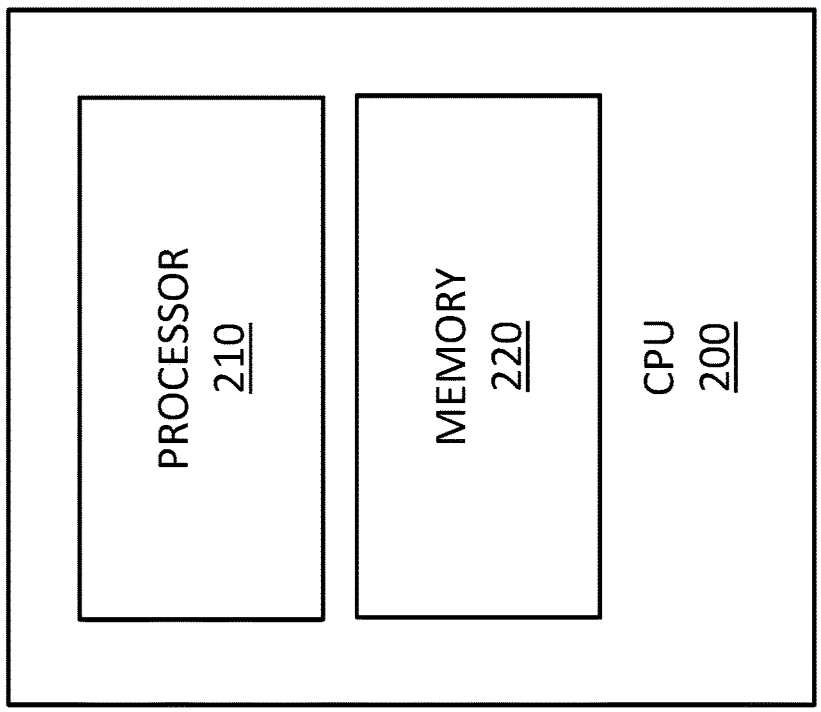
FIG. 2 illustrates a block diagram of an example of a processor in a multi-device computer system constructed according to the principles of the disclosure.

FIG. 2 illustrates a block diagram of an example of a CPU 200, such as the CPU 110 in FIG. 1. The CPU 200 includes a processor 210 and a memory 220, which are connected using conventional means.

In the illustrated embodiment, the processor 210 is configured to allocate a data set for executing an application across the local memories of the connected devices such that the application can be executed as fast as possible given the storage capacities, e.g., an amount of data, of the local memories. As such, once the data set for executing the application is received, the processor 210 first determines whether the received data set can be copied/replicated in each of the local memories. If the data set can be replicated fully in each of local memories, the processor 210 does so for the most run-time efficient operation as the data necessary for executing the application can be accessed locally. If the data set cannot be replicated in each of the memories, the processor 210 replicates a portion of the data set in each of the local memories and distributes a remaining portion of the data set across the local memories. The processor 210 can identify subsections of the data set that is more frequently accessed than the others and apportions as much of those subsections as it can for replication.

In one embodiment, the remaining portion can be distributed across only some of the memories that have faster connections than the others. The connection speeds between memories can be determined based on a type of link that the memories use. For example, the processor 210 can distribute the remaining portion of the data set across devices that are connected using NVLink, e.g., devices within a same island.

In the illustrated embodiment, the memory 220 is configured to store data and computer programs and can have the structure of a conventional memory. The memory 220 may store a data set for executing an application and operation instruction to direct the operation of the processor 210 when initiated thereby. In one embodiment, the application is a ray tracing application, and the stored data set includes geometry data and texture data for scene objects. The stored operating instructions may correspond to pseudo code/algorithm in a computer program that controls the processor 210 to allocate the stored data set across the local memories of the connected devices. In one embodiment, the memory 220 or at least a portion thereof is a non-volatile memory.

Figure 3:
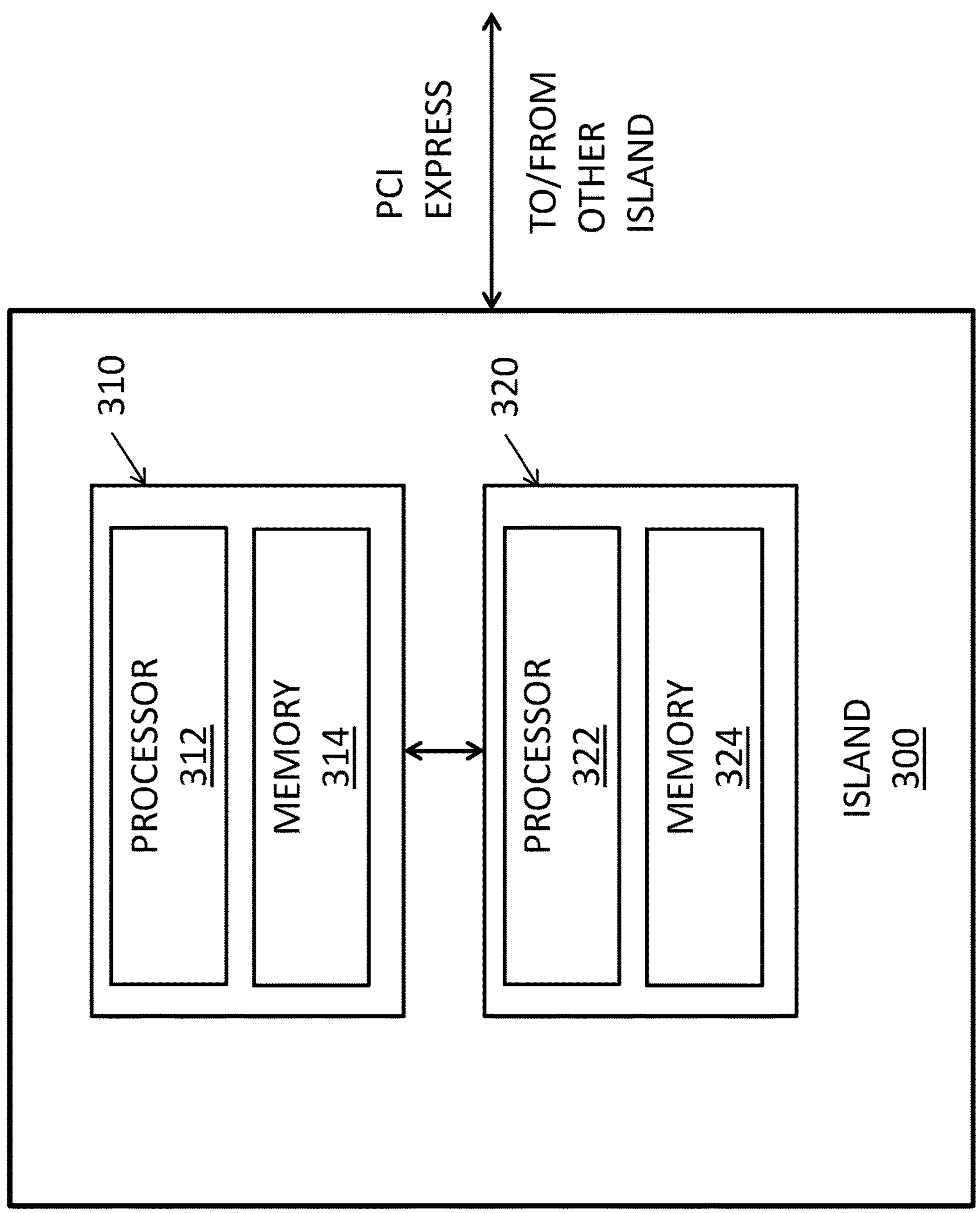
FIG. 3 illustrates a block diagram of an example of an island in a multi-device computer system constructed according to the principles of the disclosure.

FIG. 3 illustrates a block diagram of an example of an island, such as the island 120 or 130 in FIG. 1. In the illustrated embodiment, the island 300 includes two devices 310 and 320 that are connected to one another using one type of link, e.g., NVLjnk™. The devices 310 and 320 are also connected to devices outside the island 300 using a different type of link such as a PCIe. As NVLink is faster than PCIe, the devices 310 and 320 within the island 300 can communicate, e.g., access each other's memory, with each other faster than they can with the devices outside the island 300. It is understood that the number of the devices in a given island is not limited to two and may be greater. In one embodiment, the devices 310 and 320 may be graphics cards.

In the illustrated embodiment, the devices 310 and 320 each include a processor 312 and 322 and a memory 314 and 324. The processors 312 and 322 are configured to map the memories of the devices in the system and access the data set stored in the mapped memories for executing an application. In one embodiment, the processors 312 and 322 are GPUs of graphics cards.

The memories 314 and 324 are constructed to store data and computer programs. In addition to the data set and instructions for using the data set to execute the application, the memories 314 and 324 also store address logic for accessing the data set from the memories of other devices in a system. The address logic may use multiple base pointers to locate and access the distributed and interleaved pieces of the data set from memories of other devices. For a ray tracing application, the stored data set may include geometry data and scene object texture data, and a portion of the geometry data may be an auxiliary data structure, e.g., a tree data structure, that can be traversed quickly to find ray/scene intersections.

One skilled in the art would understand that, although not illustrated, the devices 310 and 320 may also include a hardware page table for virtual to physical address translation and a software module for virtual to virtual address translation that may be needed in accessing the mapped memories. When included in the devices 310 and 320, the hardware page table may provide the address logic to the processors 312 and 322. In one embodiment, the memories 314 and 324 are on-board DRAMs of graphics cards.

Figure 4:
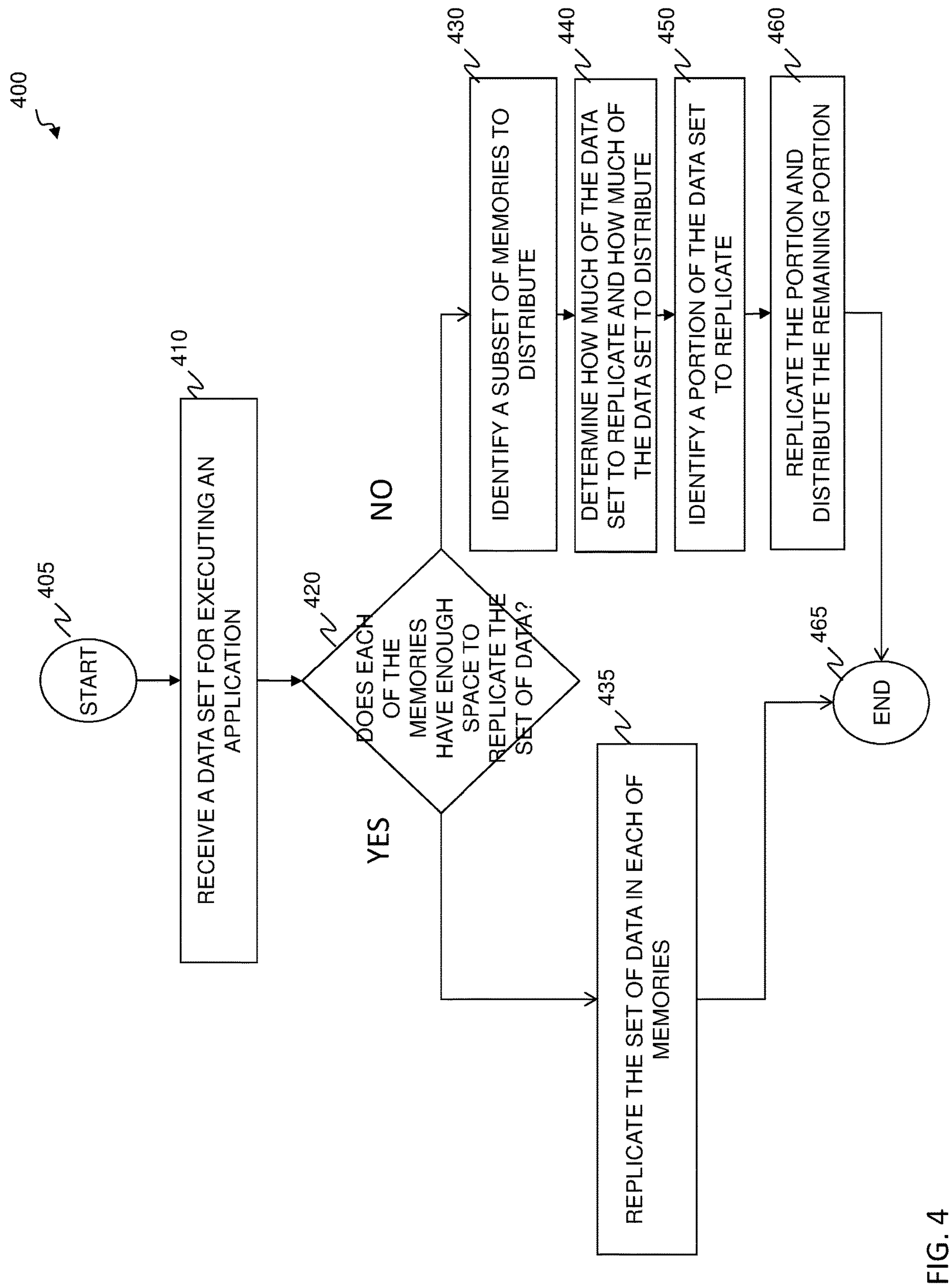
FIG. 4 illustrates a flow diagram of an example of a method for utilizing local memories of devices in a multi-device computer system carried out according to the principles of the disclosure.

FIG. 4 illustrates a flow diagram of an example of a method 400 for utilizing local memories of devices in a multi-device computer system such as the multi-device computer system 100 of FIG. 1. In the illustrated embodiment, the method is performed by a CPU and devices of the multi-device computer system. The method 400 can be performed by other processors associated with a multi-device computer system. As mentioned above, a device refers to a processor with a memory local to that processor (local memory). In one embodiment, the devices may be a graphics card having a GPU as the processor and an on-board DRAM as the local memory. The devices in the system may be connected using links of various speeds. The method 400 begins in a step 405.

In a step 410, the CPU receives and stores a data set for executing an application employing the devices in its memory. In the illustrated embodiment, the application is a raytracing application and the received data set includes geometry data and scene objects texture data.

In a step 420, the CPU determines whether the data set is larger than a storage capacity of any of the devices' memories. In the illustrated embodiment, the CPU determines, based on the storage capacities of the memories and the size, e.g., an amount of data, of the data set, whether the received data set can be replicated fully in each of the local memories of the devices. When the CPU determines that the received data set can be fully replicated in each of the local memories of the devices, the CPU replicates the received data set in each of the local memories of the devices in a step 435. This allows for the maximum performance as each device can execute the application accessing the data set locally. Once the data set is replicated in each of the local memories, the method ends in a step 465

When the CPU determines that the received data set cannot be replicated fully in each of the local memories of the devices, the CPU identifies, in a step 430, a subset of the memories that at least some of the data set can be distributed, e.g., split/sharded and spread out, such that the data in the data set can be stored at least once across the memories. As minimizing the use of slower remote access would reduce the run-time of an application, the identified subset of the memories represents those local memories that have faster connection speeds than others. Link types between the local memories can indicate the connection speeds between the local memories. For example, a subset of local memories that are located within a same island and share a faster type of a link, such as NVLink, are identified over those that communicate between the islands and are connected using a slower link, such as PCIe. It is understood that in some embodiments where all the memories in the system may have the same connection speed, e.g., the memories in a single island system, all of them may be identified.

Once the subset of memories to distribute are identified, the CPU determines how much (amount) of the data set needs to be replicated in each memory and how much of the data set needs to be distributed across the identified subset of memories in a step 440. The step 440 is based on the size of the data set and the number and storage capacities of the identified subset of local memories. As maximizing the use of the local access would reduce the run-time of the application, the amount of data to be replicated is maximized (and the amount of data to be distributed is thus minimized) in the illustrated embodiment.

For example, to allocate a dataset having 22 megabytes (MB) of data across a subset of two devices (each with a 16 MB of memory) in a multi-device computer system with the maximum amounts of data replicated in each device, the CPU would replicate 10 MB of the data set in each of the devices and distribute the remaining data, 12 MB, across the subset, giving each device 6 MB of data. It is understood that in some embodiments where all the data in the data set cannot be stored even at least once across the memories (full distribution), the CPU would issue an out-of-memory error.

In a step 450, in view of the result from the step 440, the CPU identifies a portion of the data set that needs to be replicated (replication portion) and another (remaining portion) to be distributed based on an access frequency of the data set. In the current disclosure, the term "access frequency" refers to an estimated number of times a given data set for an application would be accessed when the application is executed. As maximizing the use of the local access would reduce the run-time of an application, the CPU identifies subsections of the data set that would be more frequently accessed than others as the replication portion and the remaining subsections of the data set as the distribution portion in the illustrated embodiment.

In the illustrated embodiment, application specific information such as an algorithm for building the application's data structure and the application's data layout and data composition is used in identifying more frequently accessed subsections of the data set. The application specific information can indicate the memory locations and access frequencies of subsections in the data set. For example, the raytracing application specific information can indicate subsections that are more frequently accessed than the others, such as those including an upper portion of the raytracing application's tree data structure (which is more frequently accessed than the bottom portion) and the ray-scene intersection data (which is accessed more frequently than the individual texture image data). The CPU can identify the more frequently-accessed subsections as the replication portion and the remaining subsections as the remaining portion. The memory system (of the CPU or the device) can also use that the application specific information to avoid distributing the upper portion of the tree data structure. It is understood that the application specific information may not be available to the CPU in some embodiments. In such embodiments, the method 400 may skip the step 450 and proceed to a step 460.

In the step 460, the CPU replicates the replication portion of the data set in each of the local memories and distributes the remaining portion of the data set across the subset of the local memories. Once the respective portions of the data set are replicated and distributed in the memories, the method may end in a step 465. In one embodiment where there are more than one data set for executing a particular application, the method 400 may loop back to the step 410 and be repeated until all data sets for executing the particular application are properly stored.

In one embodiment, the remaining portion is distributed evenly, e.g., divided and spread out in equal-sized pieces/shards, across the subset of the local memories. In another embodiment, the distribution portion is distributed across the subset of the local memories in an interleaved fashion. In such an embodiment, the equal-sized pieces/shards are split again into smaller, e.g., equal-sized, pages before being distributed across the memories. For example, in a two-device system, device A's memory may hold pages 0, 2, 4 while device B's memory may hold pages 1, 3, 5 in their respective shards. It is understood that to access the distributed/interleaved the data set correctly, the address logic that account for the distribution portion being split across memory spaces (e.g., having multiple base pointers) and the page interleaving needs to be employed. Such address logic can be included in the memory of the device as a part of the accessing algorithm, inserted by a complier when the algorithm is lowered to executable machine/intermediate code, or provided by a hardware page table of the device.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Certain embodiments disclosed herein can relate to computer program products stored in a non-transitory computer-readable medium that can cause, when executed, processors such as those in the CPUs and GPUs in FIGS. 1-3, to perform one, multiple or all of the steps of the above-described methods or functions of the system or apparatus described herein.

Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Some of the techniques and operations described herein may be implemented by a one or more computing systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, storage devices, a reconfigurable computing device such as a field programmable array (FPGA), or any type of computing or electronic device.

The above-described system, apparatus, and methods or at least a portion thereof may be embodied in or performed by various processors, such as digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system or apparatus described herein.

What is claimed is:

1. A method for utilizing a plurality of memories associated with a plurality of devices in a computer system, comprising:

receiving an application-specific data set for executing an application employing said devices, wherein said data set is workload data of said application;

determining whether said data set is larger than a storage capacity of any of said memories;

when said data set is larger than said storage capacity of any of said memories, determining a maximum size of a portion of said data set that is replicable in each of said memories while being able to distribute a remaining portion of said data set across at least some of said memories at least once;

replicating said portion of said data set in each of said memories; and distributing said remaining portion of said data set across said at least some of said memories.

2. The method of claim 1, wherein said maximum size of said portion is determined based on a size of said data set, storage capacities of said memories, connection speeds between said memories, and an access frequency of said data set.

3. The method of claim 1, wherein said portion is identified based at least on an access frequency of said data set.

4. The method of claim 1, wherein said at least some of said memories are identified based at least on connection speeds between said memories.

5. The method of claim 1, wherein said distributing includes distributing said remaining portion evenly across said at least some of said memories.

6. The method of claim 1, wherein said distributing includes interleaving said remaining portion of said data set across said at least some of said memories.

7. The method of claim 1, further comprising replicating said data set in each of said memories when said data set is not larger than said storage capacity of any of said memories.

8. A computer program product stored in a non-transitory computer readable medium that, when executed, causes a processor to:

receive an application-specific data set for executing an application employing devices of a multi-device computer system, wherein each of said devices has a memory, and said data set is workload data of said application;

determine whether said data set is larger than a storage capacity of any of said memories;

when said data set is larger than said storage capacity of any of said memories, determine a maximum size of a portion of said data set that is replicable across said memories while being able to distribute a remaining portion of said data set across at least some of said memories at least once;

replicate said portion of said data set in each of said memories; and distribute said remaining portion of said data set across said at least some of said memories.

9. The computer program product of claim 8, wherein said portion is identified based at least on an access frequency of said data set.

10. The computer program product of claim 8, wherein said at least some of said memories are identified based at least on connection speeds among said memories.

11. The computer program product of claim 8, wherein said remaining portion is distributed evenly across said at least some of said memories.

12. The computer program product of claim 8, wherein said portion is estimated to be accessed more frequently than said remaining portion of said data set when said application is executed.

13. The computer program product of claim 8, wherein said application is a raytracing application.

14. The computer program product of claim 8, wherein said data set has a tree data structure and said portion is in an upper portion of said tree data structure.

15. A multi-device computer system comprising:

a plurality of devices connected to one another, each having a memory; and a processor connected to said devices and configured to:

determine whether an application-specific data set for executing an application employing said devices is larger than a storage capacity of any of said memories, wherein said data set is workload data of said application;

when said data set is larger than said storage capacity of any of said memories, determine a maximum size of a portion of said data set that is replicable in each of said memories while being able to distribute a remaining portion of said data set across at least some of said memories at least once;

replicate said portion of said data set in each of said memories; and distribute said remaining portion of said data set across said at least some of said memories.

16. The multi-device computer system of claim 15, wherein said maximum size of said portion is determined based on a size of said data set, storage capacities of said memories, connection speeds between said memories, and an access frequency of said data set.

17. The multi-device computer system of claim 15, wherein said remaining portion is distributed evenly across said at least some of said memories.

18. The multi-device computer system of claim 15, wherein said portion is accessed more frequently than said second remaining portion while said application is executed.

19. The multi-device computer system of claim 15, wherein said processor is a central processing unit.

20. The multi-device computer system of claim 15, wherein said devices are graphics cards and said memories are dynamic random-access memories of said graphics cards.

* * * * *